United States Patent
Luo et al.

(10) Patent No.: US 11,300,510 B2
(45) Date of Patent: Apr. 12, 2022

(54) FLUORESCENT SENSING FILM FOR PH PLANAR OPTODE, PREPARATION METHOD AND APPLICATION

(71) Applicant: NANJING UNIVERSITY, Nanjing (CN)

(72) Inventors: Jun Luo, Nanjing (CN); Xuan Hu, Nanjing (CN); Chaogen Liang, Nanjing (CN); Wen Fang, Nanjing (CN); Zhaodong Liu, Nanjing (CN); Daixia Yin, Nanjing (CN)

(73) Assignee: NANJING UNIVERSITY, Nanjing (CN)

( * ) Notice: Subject to any disclaimer, the term of this patent is extended or adjusted under 35 U.S.C. 154(b) by 0 days.

(21) Appl. No.: 16/756,476

(22) PCT Filed: Nov. 19, 2018

(86) PCT No.: PCT/CN2018/116081
§ 371 (c)(1),
(2) Date: Apr. 16, 2020

(87) PCT Pub. No.: WO2019/242221
PCT Pub. Date: Dec. 26, 2019

(65) Prior Publication Data
US 2020/0300760 A1    Sep. 24, 2020

(30) Foreign Application Priority Data
Jun. 19, 2018    (CN) .......................... 201810628872.0

(51) Int. Cl.
| | |
|---|---|
| G01N 21/64 | (2006.01) |
| G01N 21/80 | (2006.01) |
| G01N 31/22 | (2006.01) |
| C09B 57/00 | (2006.01) |
| G01N 21/77 | (2006.01) |

(52) U.S. Cl.
CPC ......... G01N 21/643 (2013.01); C09B 57/001 (2013.01); G01N 21/80 (2013.01); G01N 31/221 (2013.01); G01N 2021/6434 (2013.01); G01N 2021/7786 (2013.01)

(58) Field of Classification Search
CPC .......... C09B 57/001; G01N 2021/6434; G01N 2021/7786; G01N 21/6428; G01N 21/643; G01N 21/80; G01N 31/221; Y10T 436/173845; Y10T 436/18; Y10T 436/186
USPC ................ 436/111, 119, 122, 163, 164, 172; 422/82.05, 82.06, 82.07, 82.08
See application file for complete search history.

(56) References Cited

U.S. PATENT DOCUMENTS

| | | | |
|---|---|---|---|
| 5,273,716 A * | 12/1993 | Northrup | G01N 21/643 422/82.07 |
| 5,496,522 A | 3/1996 | Vo-Dinh et al. | |
| 7,390,462 B2 * | 6/2008 | Rao | G01N 21/6428 422/504 |
| 9,199,928 B2 * | 12/2015 | Riechers | G01N 21/80 |
| 2006/0088722 A1 * | 4/2006 | Aller | G01N 21/643 428/500 |
| 2006/0105174 A1 * | 5/2006 | Aller | C08F 220/54 428/411.1 |
| 2009/0325220 A1 | 12/2009 | Reed et al. | |
| 2010/0279428 A1 * | 11/2010 | Rhee | B82Y 30/00 436/172 |
| 2015/0011010 A1 * | 1/2015 | Steinbrueck | G01N 21/80 436/163 |
| 2020/0299231 A1 * | 9/2020 | Luo | C07C 303/28 |

FOREIGN PATENT DOCUMENTS

| | | | |
|---|---|---|---|
| CN | 101213439 A | | 7/2008 |
| CN | 102127425 A | | 7/2011 |
| CN | 104359884 A | * | 2/2015 |
| CN | 108572165 | | 9/2018 |
| CN | 108619656 | | 10/2018 |

OTHER PUBLICATIONS

Hulth et al. Limnol. Oceanogr.. vol. 47(1), 2002, pp. 212-220.*
Zhu et al. Environ. Sci. Technol.. vol. 39, 2005, pp. 8906-8911.*
Spry, D . B . Proton Transfer and Proton Concentalions in Protonated Nation Fuel Ce 11 Membranes J. Phys. Chem. B, 113, (Jul. 2, 2009) ISSN: 1520-5207.
Finkler, B. "Highly photostable "super"-photoacids for ultrasensitive fluorescence spectroscopy" Photochem. Photobiol. Sci○ , 1 8 (Mar. 1, 2014) ISSN: 1474-9092.

* cited by examiner

*Primary Examiner* — Maureen Wallenhorst
(74) *Attorney, Agent, or Firm* — Zhihua Han; Wen IP LLC

(57) ABSTRACT

The present invention provides a fluorescent dye HPTS-lipo for monitoring two-dimensional pH value, a fluorescent sensing film, and use thereof, belonging to the field of two-dimensional pH value monitoring. The fluorescence sensing film for monitoring two-dimensional pH is prepared from the fluorescent dye HPTS-lipo, and HPTS-lipo is embedded by hydrogel D4 in a preparation process. The fluorescent dye HPTS-lipo is prepared by ligating alkylamine into sulfonic acid groups of the fluorescent dye HPTS. Compared with the fluorescent dye HPTS, the pKa value of the modified fluorescent dye HPTS-lipo is significantly varied, so that the fluorescent sensing film is suitable for monitoring different pH values and meets different experimental requirements; and the fluorescent dye HPTS-lipo has better hydrophobicity, can be kept for longer time in environment, and further solves the problem of dye leakage after being embedded by the hydrogel.

11 Claims, 6 Drawing Sheets

FLUORESCENT SENSING FILM FOR PH PLANAR OPTODE, PREPARATION METHOD AND APPLICATION

CROSS REFERENCE TO RELATED APPLICATION

This invention is a national stage application of International application number PCT/CN2018/116081, filed on Nov. 19, 2018, titled "FLUORESCENT SENSING FILM FOR PH PLANAR OPTODE, PREPARATION METHOD AND APPLICATION," which claims the priority benefit of Chinese Patent Application No. 201810628872.0, filed on Jun. 19, 2018, which is hereby incorporated by reference in its entirety.

TECHNICAL FIELD

The present invention belongs to the technical field of planar optode for monitoring two-dimensional pH values, and particularly relates to pH planar optode fluorescent sensing film, and a preparation method and use thereof.

BACKGROUND pH is an important index in environment that affects geochemical cycling of various heavy metals and metalloid elements. Take rhizosphere microzone as an example, plant roots can affect surrounding environment pH by secreting root exudates and other behavior, causing rhizosphere acidification or alkalization. Therefore, the rhizosphere effect is crucial for studying the geochemical cycling of heavy metals and metalloids.

Conventional methods for pH measurement are mainly based on electrode sensors. On one hand, since electrode is a single-point measurement and expensive, if the sensors are arranged in a large area in the rhizosphere, the costs are relatively high. On the other hand, such invasion may destroy rhizosphere micro-interface and cause disturbance to rhizosphere activities. In that case, in-situ, real-time, and non-invasive detection methods in rhizosphere microenvironment or other microzones have become an urgent need in environmental research.

Since 1990s, the research on two-dimensional fluorescent sensing has developed rapidly. Analytes can be measured by fixing fluorescent dyes or embedding agents on a plane. Similar sensors, such as $O_2$, pH, $CO_2$, and $NH_3$ sensors have been successfully developed and applied to environmental research. These sensors are highly sensitive and stable, can adapt to environmental heterogeneity. Therefore, it is suitable for quantitative detection of analytes in environmental micro-interface research.

In recent years, due to its in-situ, real-time, and non-invasive detection, more and more attention has been paid to optical sensor, and especially development of planar optode technology for two-dimensional fluorescent imaging. Through retrieval, we found relevant applications have been published in the prior art for research on fluorescent sensing films. For example, Chinese patent application CN201410643390.4, published on Feb. 18, 2015, discloses pH fluorescent sensing film, including a film substrate. Fluorescent dye-CPIPA is evenly mixed with fluorescein 10-GN, and the two fluorescent dyes are fixed on surface of the film substrate by chemical embedding. Based on the pH fluorescent sensing film, the invention further discloses a two-dimensional dynamic detection method for pH distribution in alkaline sediment. The pH fluorescent sensing film is placed in the sediment, spectral information of two dyes is obtained through an imaging apparatus under irradiation by excitation light. Then pH distribution characteristics of the sediment are obtained through a quantitative way of R and B channel fluorescence intensity ratios. The mixture of CPIPA and fluorescein 10-GN holds a reference effect and a brightness enhancement effect, showing high pH detection sensitivity, high spatial resolution The method adopts a planar optode technology, reduces optical interference through quantification by fluorescence ratio, and realizes dynamic two-dimensional real-time and in-situ detection of pH distribution information in alkaline sediment. However, the fluorescent dye CPIPA in this application is only suitable for a meta-alkalescence working range, which limits its application.

Chinese patent application CN201110407804.X, published on Apr. 3, 2013, discloses an optical ion sensing film for detecting pH, which comprises the following components by weight percentage: ETH5418 (0.38%-0.42%), sodium tetrakis [3,5-bis(trifluoromethyl)phenyl]borate (0.44%-0.49%), up-conversion nan-rods (2.09%-2.14%), PVC (33.13%-33.16%), and di(2-ethylhexyl)sebacate or o-nitrobenzene octyl ether or dioctyl phthalate is added to 100%. The invention further discloses a method for preparing the foregoing optical ion sensing film and use of the sensing film in pH detection. This sensing film is excited by 980 nm light, and its emission also occurs in near infrared region. The sensor eliminates the background absorption and background fluorescence interferences. Compared with the conventional system, this system has a higher quantum yield. The preparation process of the optical ion sensing film in this application needs various chemical reagents, which is relatively high in costs and not conducive to promotion.

8-hydroxy-1,3,6-trisulfonyl pyrene (HPTS) is a widely used-green light emission pH sensitive fluorescent material for preparing two-dimensional fluorescent sensing film. Moreover, HPTS is also a water-soluble fluorescent substance with low toxicity. Depending on the pH environment, HPTS changes within protonated and deprotonated forms. HPTS has high quantum yield and large Stokes shift. The pKa value of HPTS determines that HPTS is suitable for studying pH changes in natural environments and organisms. However, its strong water solubility limits its application in natural environment.

The prior art also discloses relevant applications for research on application of HPTS to fluorescent optical fiber sensors. For example, Chinese patent CN 201510171727.0 published on Nov. 24, 2017 provides a single-point dual-parameter fluorescence optical fiber sensor probe for monitoring pH value and oxygen partial pressure. The probe includes: optical fiber probe, a polyurethane hydrogel layer (fixed on the optical fiber probe), pH sensitive particles, and oxygen sensitive particles (the pH sensitive particles and the oxygen sensitive particles are dispersed and embedded in the polyurethane hydrogel layer). The pH sensitive particles are prepared by covalently immobilizing HPTS on amino-modified p-HEMA; and the oxygen sensitive particles are prepared by embedding $Ru(dpp)_3^{2+}$ in organic modified silicate through solvent trichloromethane. However, the preparation process of this application is complicated.

In addition, since HPTS has strong water solubility, limited application in natural environments, easy leakage of a fluorescent dye, and a narrow application range, HPTS needs to be hydrophobic modified to avoid leaking from the probe—two-dimension fluorescent sensing foil.

SUMMARY

1. Problems to be Solved

In view of problems of strong water solubility of HPTS, limited application in natural environments, easy leakage of a fluorescent dye, and a narrow application range, the present invention provides a novel fluorescent dye and pH planar optode fluorescent sensing film, as well as its preparation method and application.

2. Technical Solution

In order to solve the foregoing problems, the technical solutions adopted by the present invention are as follows:

The present invention provides a pH planar optode fluorescent sensing film, which is prepared from fluorescent dye HPTS-lipo, wherein the fluorescent dye HPTS-lipo is prepared by introducing di-n-butylamine or dimethylamine into sulfonic acid groups of HPTS. After introduction of alkylamine groups, HPTS has successfully changed from water-soluble to fat-soluble. Details can be seen from a Log D curve of the substance.

As a further improvement of the present invention, a method for preparing the fluorescent dye HPTS-lipo comprises the following steps:

(1) reacting HPTS with acetic anhydride in NaOH solution, extracting the product with anhydrous ethanol, and performing suction filtration to obtain the hydroxyl protected product;

(2) refluxing the hydroxyl protected product and thionyl chloride to obtain a sulfonyl chloride intermediate;

(3) reacting the di-n-butylamine or dimethylamine with the sulfonyl chloride intermediate in DCM; and after reaction is completed, performing rotary evaporation, and using NaOH for deprotection to obtain HPTS-lipo.

As a further improvement of the present invention, a method for preparing the pH planar optode fluorescent sensing film comprises the following steps:
  (a) dissolving hydrogel D4 in an aqueous solution containing anhydrous ethanol to preparehydrogel D4 stock solution;
  (b) preparing fluorescent dye HPTS-lipo stock solution; and
  (c) mixing the hydrogel D4 stock solution with the fluorescent dye HPTS-lipo stock solution to obtain the mixed solution to fabricate the film.

As a further improvement of the present invention, the mass ratio of the hydrogel D4 to the fluorescent dye in the mixed solution is 100:1.

As a further improvement of the present invention, the volume ratio of the anhydrous ethanol to water in the aqueous solution containing the anhydrous ethanol is 9:1.

As a further improvement of the present invention, the present invention provides a planar optode for monitoring two-dimensional pH value by using the fluorescent sensing film.

As a further improvement of the present invention, according to an application method of the planar optode for monitoring two-dimensional pH value, the fluorescent sensing film is fixed on an interface and excited by UV light source, then the dynamic spatio-temporal distribution information of pH can be acquired by the image capturing system.

As a further improvement of the present invention, according to the application method of the planar optode for monitoring two-dimensional pH value, the wavelength of the ultraviolet excitation light source is 405 nm.

As a further improvement of the present invention, according to the application method of the planar optode for monitoring two-dimensional pH value, the image capturing system includes a CCD device and a terminal storage device.

As a further improvement of the present invention, the application method of the planar optode for monitoring two-dimensional pH value comprises the following steps:
  (a) calibrating the planar optode sensing film in a 10 nM Tris-HCl buffer, and adjusting pH with NaOH and HCl respectively;
  (b) under 405 nm LED excitation, obtaining photos recording the fluorescent intensity of each pixel, using ImageJ to extract the green channel fluorescence intensity and using Boltzmann equation for fitting;
  (c) using the obtained marked line as a quantitative basis; when the fluorescent sensing film of the present invention is applied to environment, noting that the sensing film must closely attached to the surface of an object. The films are excited under 405 nm LED excitation and then using the camera to record the photos. Using ImageJ to extract the green channel fluorescent intensity at each pixel, and substituting the data into the previously fitted curve for subsequent calculating the pH distribution information.

3. Beneficial Effects

Compared with the prior art, beneficial effects of the present invention are as follows:

(1) The pH planar optode fluorescent sensing film of the present invention is prepared by adopting HPTS-lipo, which is a derivative obtained by ligating alkylamine to an easily-soluble aromatic sulfonate structure of HPTS, so that the hydrophobicity of HPTS-lipo is greatly enhanced. Therefore, HPTS-lipo can exist in environment for longer time, and further the sensing film can meet requirements of long-term experiments.

(2) The pH planar optode fluorescent sensing film of the present invention is prepared by adopting the HPTS-lipo, which is characterized by small polarity and strong hydrophobicity compared with HPTS. As HPTS-lipo is embedded in hydrogel D4 to prepare the sensing film, the dye is less likely to leak from the film, the application range of this sensing film in the pH monitoring field is expanded. However, HPTS has strong water solubility, if it is embedded by hydrogel D4, HPTS dissolves out immediately after contacting with water. The obtained sensing film cannot be applied to natural environments, and can only be treated with a more special embedding agent or embedding method. Consequently, the investment cost is relatively high.

(3) The fluorescent sensing film for monitoring two-dimensional pH value of the present invention is prepared from HPTS-lipo. Compared with HPTS, the pKa value of the modified HPTS-lipo is different, so that the sensing film is suitable for monitoring different pH values and meets different experimental requirements.

(4) According to the fluorescent sensing film for monitoring two-dimensional pH value of the present invention, the applicable pH range of this film prepared from dimethylamine-HPTS is 5-9, while from di-n-butylamine-HPTS is 3-11. Thus di-n-butylamine modified HPTS derivatives applicable to a wider pH range and has a wider application range.

(5) According to the fluorescent sensing film for monitoring two-dimensional pH value of the present invention, the planar optode sensing film can instantly respond to signals in practical application process. Comparing with the pH planar optode films in the prior art, the present planar optode film greatly shortens the response time and therefore is beneficial to popularization.

(6) According to the fluorescent sensing film for monitoring two-dimensional pH value of the present invention, in the preparation process, we use hydrogel D4 to imbed HPTS-lipo. The operation is simple and cheap; compared with embedding dye molecules by complex means, this method reduces difficulty in fabricating the film; and the film has a wide application range and is easy to popularize.

DETAILED DESCRIPTION OF EMBODIMENTS

The present invention is further described below with reference to specific examples.

Example 1

A process of preparing fluorescent dye HPTS-lipo in this example comprises the following steps:

(1) In 2 mol/L NaOH solution, react HPTS with acetic anhydride at room temperature according to 1:3 times equivalent, extract the product with anhydrous ethanol, and use suction filtration to obtain the hydroxyl protected product.

(2) Reflux hydroxyl protected HPTS and thionyl chloride for 2 hours at 90° C. according to 1:4 times equivalent to obtain sulfonyl chloride intermediate, and vacuum drying thionyl chloride to obtain HPTS-$SO_2Cl$.

Figure 2:
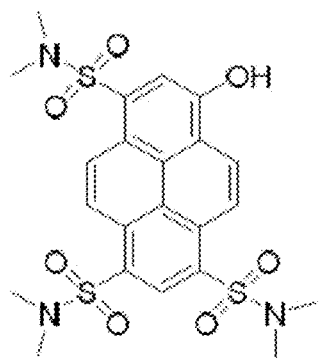
FIG. 2 is the schematic diagram of the chemical structure of dimethylamine-HPTS.

(3) Dissolve HPTS-$SO_2Cl$ in dichloromethane, add dimethylamine dropwise according to 1:3.1 times equivalent under ice bath condition; after the reaction is finished, rotary evaporation and use 1 mol/L NaOH to deprotect to obtain final product. Separate and purify the final product through column to obtain a pure product—HPTS-lipo, namely, dimethylamine-HPTS. FIG. 2 is the schematic diagram of the dimethylamine-HPTS chemical structure.

Figure 1:
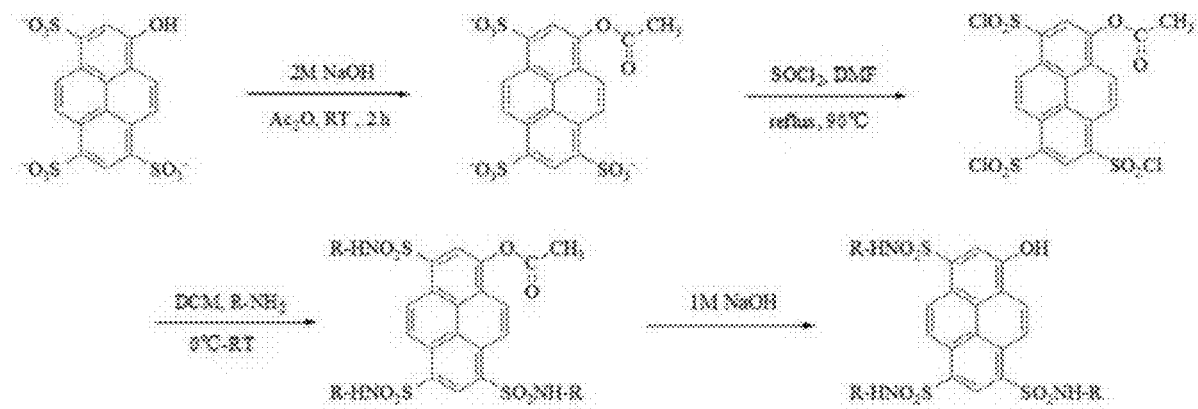
FIG. 1 is the reaction flowchart of preparation of fluorescent dye HPTS-lipo.

FIG. 1 is the reaction flowchart of preparation of the fluorescent dye HPTS-lipo.

The two-dimensional pH fluorescent sensing film is prepared by using the foregoing HPTS-lipo, and the operation steps are as follows.

(1) Dissolve 1 g hydrogel D4 in 10 mL 90% anhydrous ethanol:aqueous solution (V/V=90/10) to prepare hydrogel D4 stock solution.

(2) Prepare 1 mg/mL dimethylamine-HPTS stock solution.

(3) Take equal volume of the hydrogel D4 stock solution and the dimethylamine-HPTS stock solution and vortex until the solutions are fully mixed, wherein the mass ratio of the hydrogel D4 to the fluorescent dye in the mixed solution is 100:1. Take proper amount of the mixed solution, use 100 μm thick four-sided preparation device and the film coating machine to evenly coat the film on the surface of substrate—PET. Finally the thickness of the planar optode film is about 10 μm after organic solvent is fully volatilized.

Figure 10:
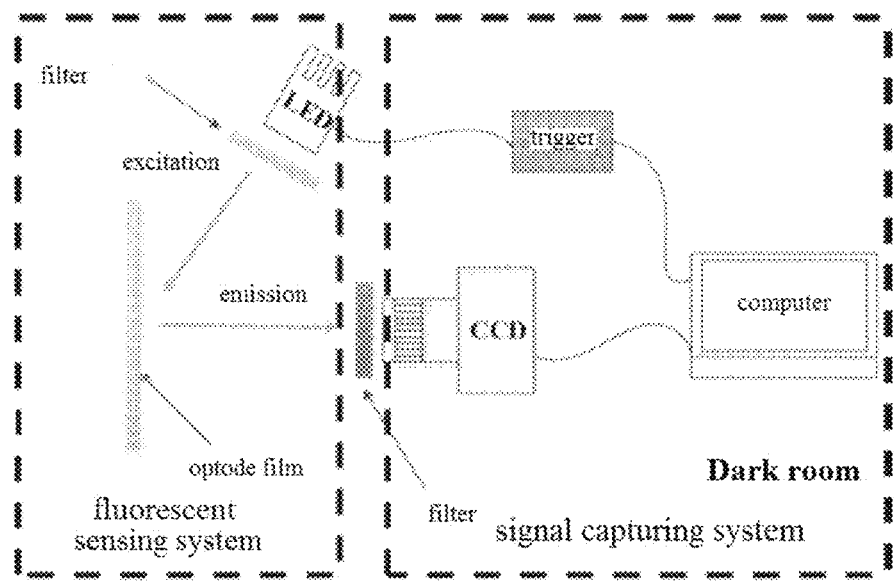
FIG. 10 is the schematic diagram of the apparatus of a planar optode experimental system.

The foregoing planar optode fluorescent sensing film is used to monitor two-dimensional pH value. This example further provides an application method of the planar optode for monitoring two-dimensional pH value. The set up of the experimental device is shown in FIG. 10. The device is composed of a fluorescent sensing system and a signal capturing system. The fluorescent sensing system contains planar optode film and an excitation light source. The light source uses special wave bands LED lamp to provide energy for the excitation of the fluorescent dyes. The signal capturing system has a computer and a signal capturing device. The computer is responsible for connections between hardware, software services and subsequent data processing. The software is generally commercially available. The signal capturing device is usually the charge coupled device (CCD) or the complementary metal oxide semiconductor (CMOS). In this example, single-intensity quantification of the planar optode film for includes the following steps:

(a) Calibrate the pH planar optode film in 10 nM Tris-HCl buffer, and adjust pH with 1 mol/L NaOH and HCl respectively.

(b) Under 405 nm LED excitation, obtain photos recording the fluorescence intensity of each pixel, using ImageJ software to extract the green channel fluorescence intensity, and using Boltzmann equation for fitting.

Figure 4:
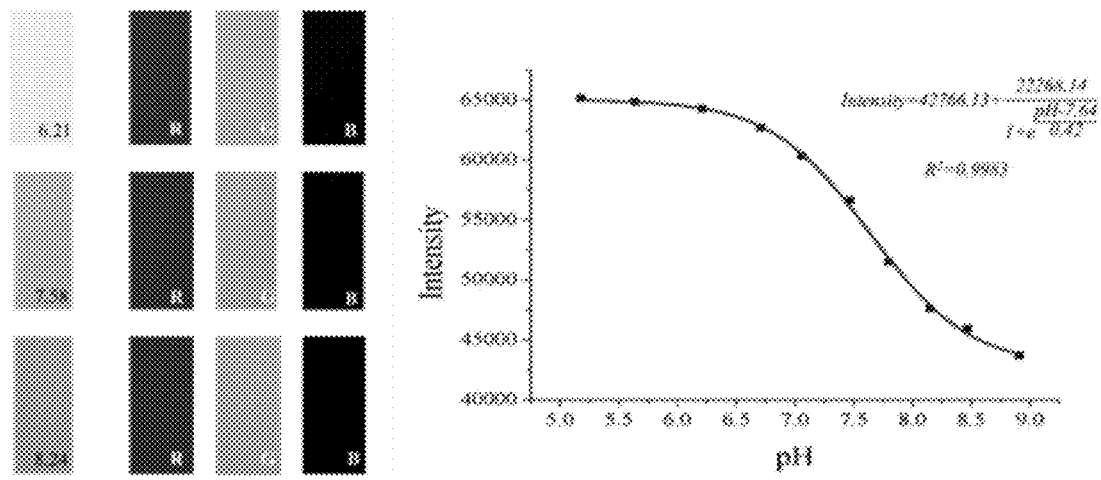
FIG. 4 is the fitting map obtained when the fluorescent sensing film of Example 1 is applied.

FIG. 4 is the fitting map obtained when the fluorescent sensing film of Example 1 is applied. Results demonstrate that the fluorescence intensity has a good fitting relationship in the pH range of 5-9.

(c) Use the calibration curve as the quantitative basis; when the fluorescent sensing film of the present invention is applied to environment, noting that the film must closely attached to the surface of the object. The films are excited under 405 nm LED excitation, and then use the camera to record the photos. Using ImageJ software to extract the green channel fluorescence intensity, and substitute the data into the previously fitted curve for subsequent calculating the pH distribution information.

In the reference "High-resolution Imaging of pH in Alkaline Sediments and Water Based on a New Rapid Response Fluorescent Planar Optode", Han et al. made a pH optode with CPIPA, which has the response time of about 120 s. While the pH planar optode film of the present invention greatly shortens the response time compared with those pH optode films in the prior art.

Characterization analysis of the ultraviolet emission spectrum and the fluorescence emission spectrum is performed respectively:

(1) For the ultraviolet emission spectrum, the slit width is 1.0 nm. A solution to be measured is obtained by mixing a 0.01 mg/mL dimethylamine-HPTS methanol solution and pH buffers with different gradients at a ratio of 4:1.

Figure 6:
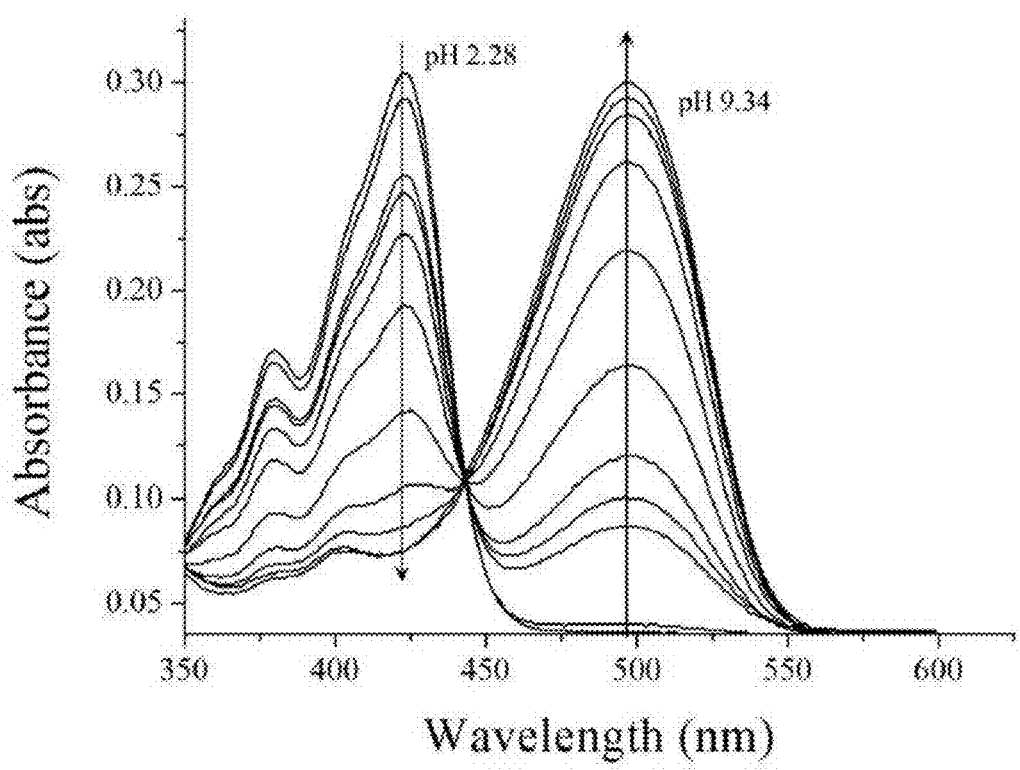
FIG. 6 is the ultraviolet excitation spectrum of dimethylamine-HPTS.

FIG. 6 is the excitation spectrum of dimethylamine-HPTS. According to the spectrum, 425 nm and 500 nm are the maximum absorption peaks. Modified dimethylamine-HPTS has a great Stokes shift, which avoids interference between the excitation light and the emission light. In application, the 405 nm UV LED lamp is selected as the excitation light source.

(2) For the fluorescence emission spectrum: An excitation wavelength of 405 nm is set, and a slit width is 1.0 mm. The solution to be measured is obtained by mixing a 0.01 mg/mL dimethylamine-HPTS methanol solution and pH buffers with different gradients at a ratio of 4:1.

Figure 7:
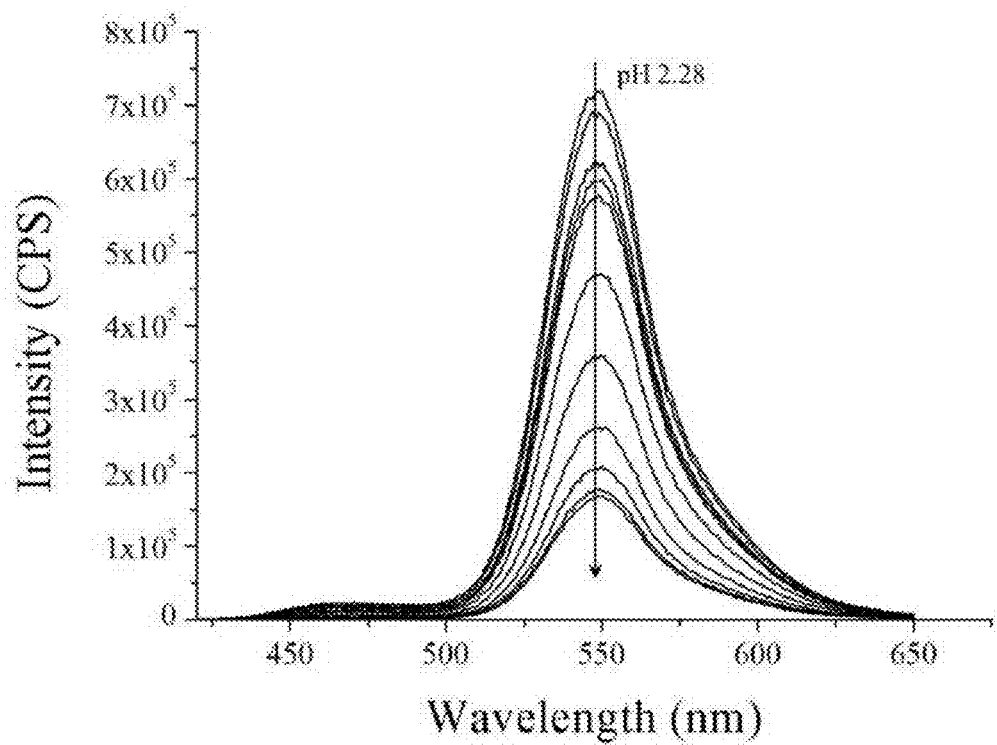
FIG. 7 is the emission spectrum of dimethylamine-HPTS under 405 nm excitation.

FIG. 7 is the emission spectrum of dimethylamine-HPTS under 405 nm excitation. According to the spectrum, dimethylamine-HPTS has a maximum emission wavelength at 550 nm. Therefore, a 550 nm high-pass filter is disposed in front of a camera to shield interference from other light sources.

What needs to be further explained is that the signal capturing system for quantifying and the LED excitation light source system of the present invention have no special restriction on the source. These systems can be purchased in the market, or open-source software can be acquired, or the systems can be self-made.

It is further explained that due to double excitation and single emission characteristics of the prepared dye, a quantitative method can be a single-intensity quantitative method or a fluorescence proportional quantitative method. Single-intensity quantification has been introduced above and the LED lamp with the wavelength of 405 nm can be used as the excitation light source. However, a specific operation method of fluorescence proportional quantification is to use 425 nm and 500 nm LED lamps as excitation light sources, respectively, and obtain fluorescence intensity values of the green channel under the two excitation light sources and record values as $I_{425}$ and $I_{500}$. Since the emission fluorescence intensity of the dye has opposite change trends with pH under two excitation wavelength, $I_{425}/I_{500}$ can be proportioned to eliminate interference caused by influencing factors such as uneven distribution of dyes and uneven distribution of excitation light source intensities. Such quantitative method is applicable to all fluorescent sensing films for planar optode that are made from HPTS-lipo with double excitation and single emission characteristics.

Figure 11:
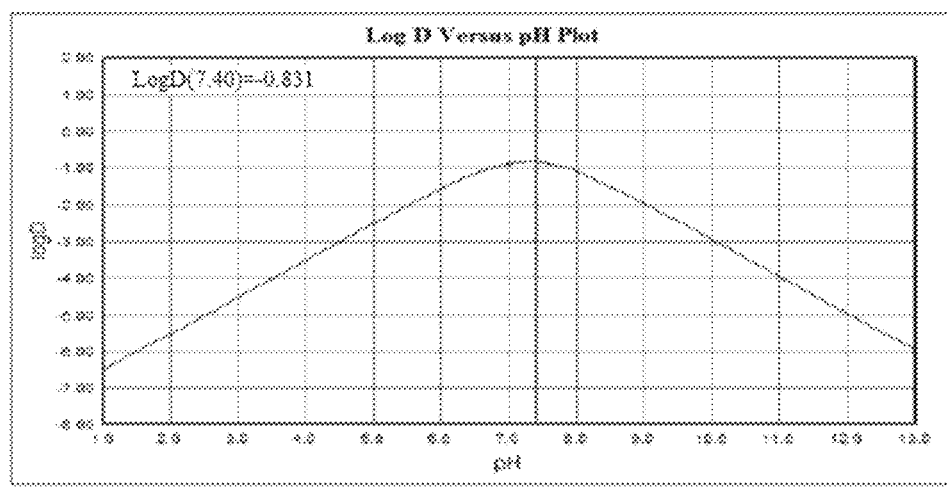
FIG. 11 is the Log D curve of HPTS.
Figure 12:
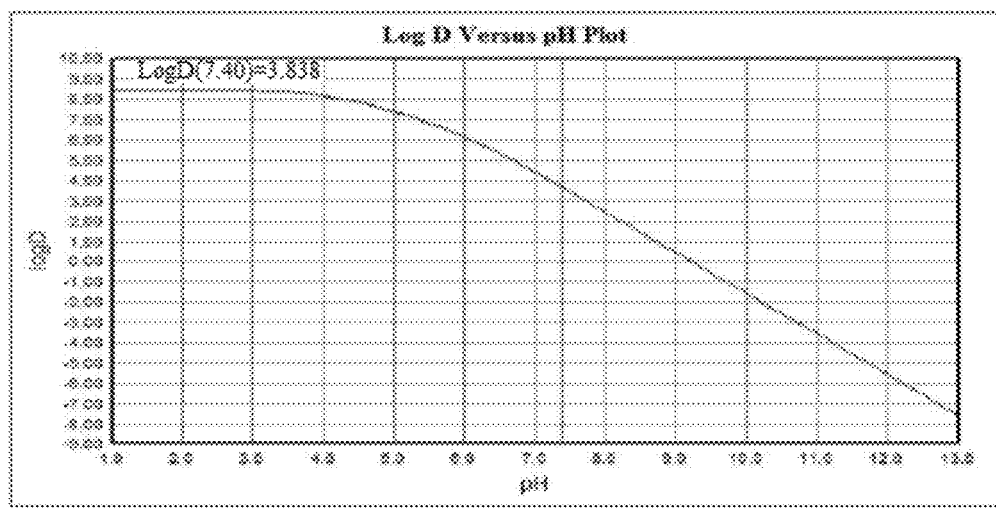
FIG. 12 is the Log D curve of HPTS-dimethylamine.

It is further described that, in order to verify whether HPTS-lipo achieves the objective of fat-soluble modification compared with HPTS, changes of octanol-water partition coefficient of HPTS and HPTS-dimethylamine with pH (Log D) are measured by potentiometric titration with a Pulse™ instrument. FIG. 11 shows the Log D curve of HPTS. The octanol-water partition coefficient increases first and then decreases with pH, but showing water-soluble as the whole. FIG. 12 shows the Log D curve of HPTS-dimethylamine. An octanol-water partition coefficient gradually decreases with pH, showing fat solubility under acidic conditions, and showing water solubility in an environment with pH of 9 or above as pH increases. It is worth noting that HPTS-dimethylamine is one of HPTS-lipo derivatives with the smallest octanol-water partition coefficient calculated by simulation. Judging from experimental results of potentiometric titration, meets the experimental requirements. The objective of fat-soluble modification is achieved.

Example 2

A process of preparing fluorescent dye HPTS-lipo in this example comprises the following steps:

(1) In 2 mol/L NaOH solution, react HPTS with acetic anhydride at room temperature according to 1:3 times equivalent, extract the product with anhydrous ethanol, and use suction filtration to obtain the hydroxyl protected product.

(2) Reflux hydroxyl protected HPTS and thionyl chloride for 2 hours at 90° C. according to 1:4 times equivalent to obtain a sulfonyl chloride intermediate, and vacuum drying thionyl chloride to obtain HPTS-SO$_2$Cl.

Figure 3:
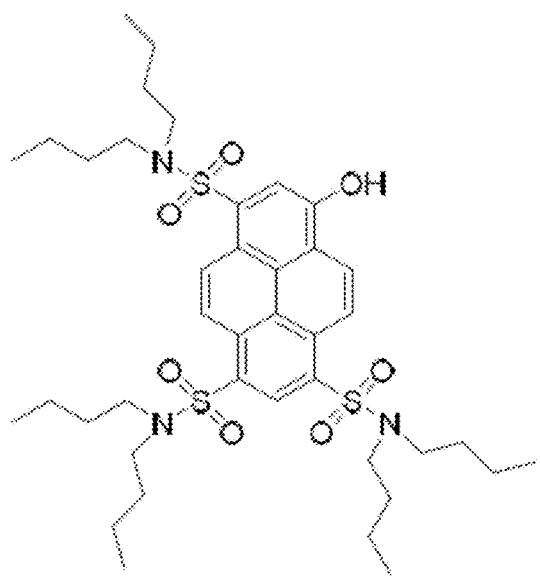
FIG. 3 is the schematic diagram of the chemical structure of di-n-butylamine-HPTS.

(3) Dissolve HPTS-SO$_2$Cl in dichloromethane, add di-n-butylamine dropwise according to 1:3.1 times equivalent under ice bath condition; after the reaction is finished, rotary evaporation and use 1 mol/L NaOH to deprotect to obtain final product. Separate and purify the final product through column to obtain a pure product—HPTS-lipo, namely, di-n-butylamine-HPTS. FIG. 3 is the schematic diagram of the di-n-butylamine-HPTS chemical structure.

The two-dimensional pH fluorescent sensing film is prepared by using the foregoing fluorescent dye HPTS-lipo by the following steps.

(1) Dissolve 1 g hydrogel D4 in 10 mL 90% anhydrous ethanol:aqueous solution (V/V=90/10) to prepare hydrogel D4 stock solution.

(2) Prepare 1 mg/mL di-n-butylamine-HPTS stock solution.

(3) Take equal volume of the hydrogel D4 stock solution and the di-n-butylamine-HPTS stock solution and vortex until the solutions are fully mixed, wherein the mass ratio of the hydrogel D4 to the fluorescent dye in the mixed solution is 100:1. Take proper amount of the mixed solution, use 100 μm thick four-sided preparation device and the film coating machine to evenly coating the film on the surface of substrate—PET, and obtain a fluorescent sensing film with the thickness of about 10 μm after organic solvent is fully volatilized.

Calibrate the pH planar optode film in 10 nM Tris-HCl buffer, and adjust pH with 1 mol/L NaOH and HCl solutions respectively; under 405 nm LED excitation, obtain photos recording the fluorescence intensities of each pixel, using ImageJ software to extract the fluorescence intensity and using Boltzmann equation for fitting.

Figure 5:
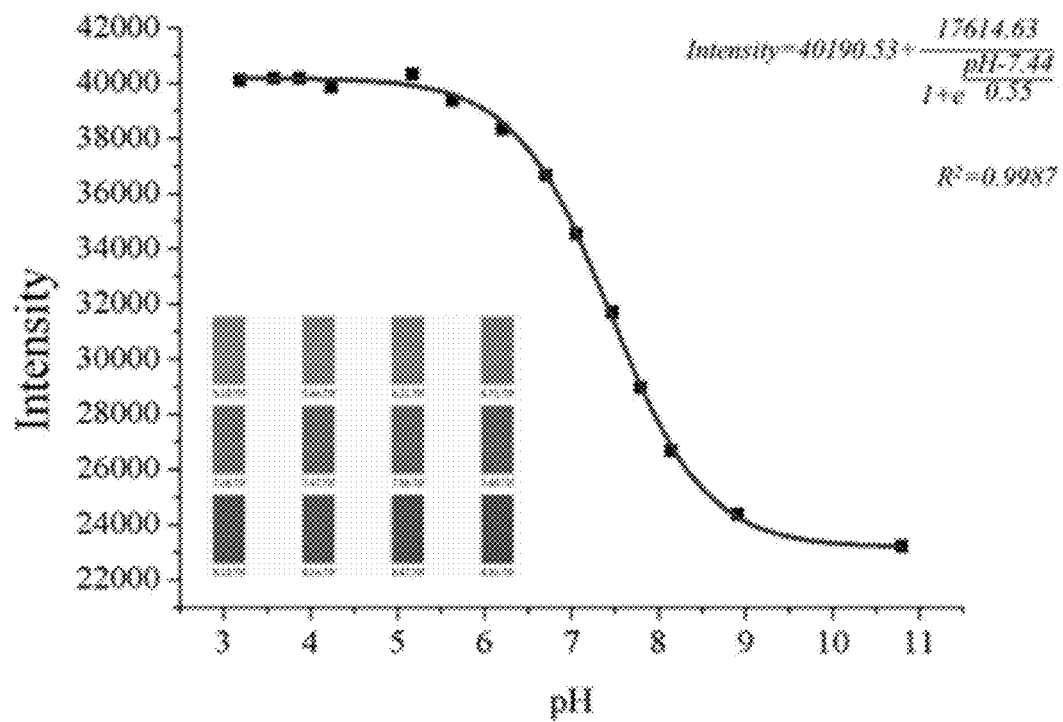
FIG. 5 is the fitting map obtained when the fluorescent sensing film of Example 2 is applied.

FIG. 5 is the fitting map obtained when the fluorescent sensing film of Example 2 is applied. Results demonstrate that the fluorescence intensity has a good fitting relationship in the pH range of 3-11.

Therefore, compared with dimethylamine-HPTS derivatives, derivatives of the fluorescent dye HPTS modified by di-n-butylamine are applicable to a wider pH range and have a wider application range.

Figure 8:
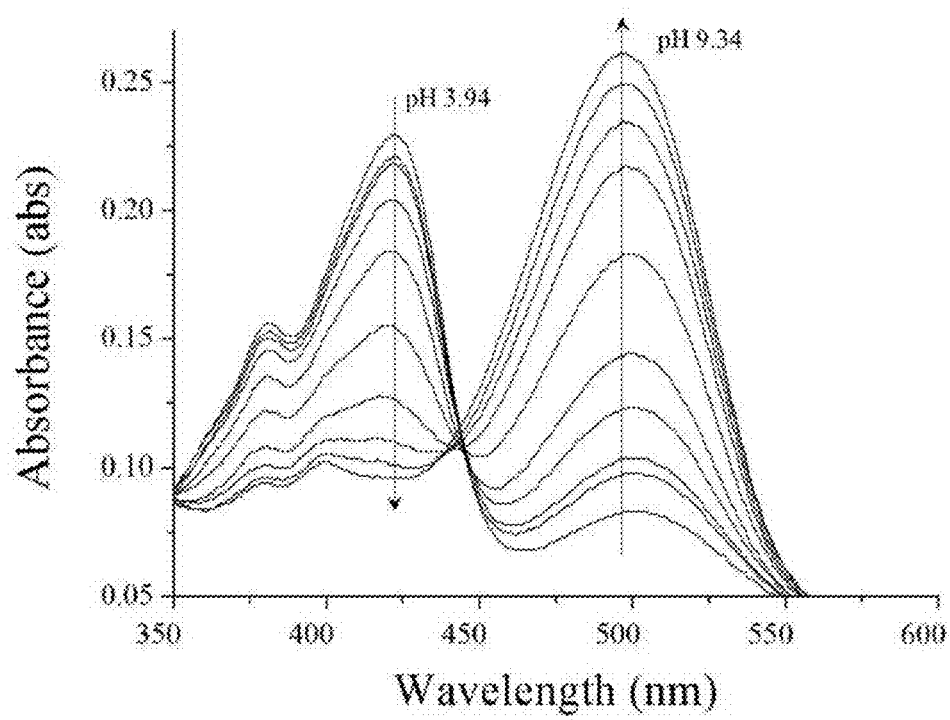
FIG. 8 is the ultraviolet excitation spectrum of di-n-butylamine-HPTS.

For this example, characterization analysis of the ultraviolet emission spectrum and the fluorescence emission spectrum is performed:

(1) For the ultraviolet emission spectrum, the slit width is 1.0 nm. A solution to be measured is obtained by mixing a 0.01 mg/mL di-n-butylamine-HPTS methanol solution and pH buffers with different gradients at a ratio of 4:1. FIG. 8 is the ultraviolet excitation spectrum of di-n-butylamine-HPTS. According to the spectrum, there are 425 nm and 500 nm double excitation peaks in the di-n-butylamine-HPTS spectrum. Modified di-n-butylamine-HPTS has a great Stokes shift, which avoids interference between the excitation light and the emission light. The 405 nm UV LED lamp is selected as the excitation light source.

Figure 9:
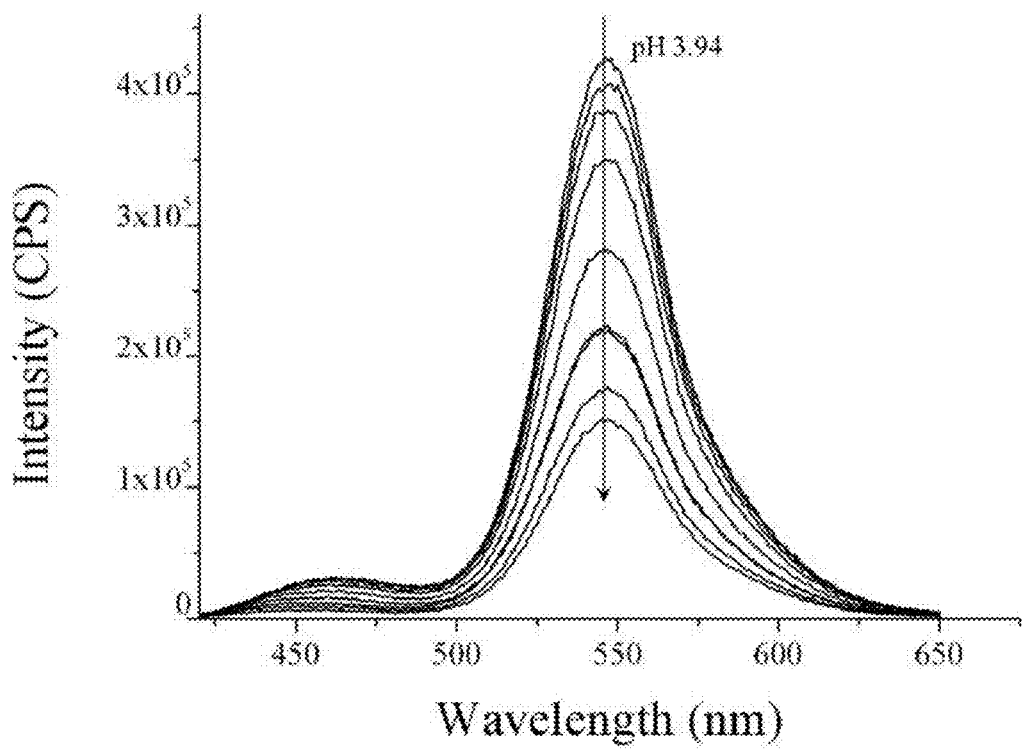
FIG. 9 is the emission spectrum of di-n-butylamine-HPTS under 405 nm excitation.

(2) For the fluorescence emission spectrum: The excitation wavelength of 405 nm is set, and the slit width is 1.0 nm. A solution to be measured is obtained by mixing a 0.01 mg/mL di-n-butylamine-HPTS methanol solution and pH buffers with different gradients at a ratio of 4:1. FIG. 9 is the emission spectrum of di-n-butylamine-HPTS under 405 nm excitation. The spectrum shows that di-n-butylamine-HPTS has a maximum emission wavelength at 550 nm. Therefore, a 550 nm high-pass filter is disposed in front of a camera to shield interference from other light sources.

Example 3

A process of preparing fluorescent dye HPTS-lipo in this example comprises the following steps:

(1) In 2 mol/L NaOH solution, react HPTS with acetic anhydride at room temperature according to 1:3 times equivalent, extract the product with anhydrous ethanol, and use suction filtration to obtain the hydroxyl protected product.

(2) Reflux hydroxyl protected HPTS and thionyl chloride for 2 hours at 90° C. to obtain a sulfonyl chloride intermediate, use DCM as a solvent in ice bath, and add di-n-butylamine dropwise.

(3) After the reaction of step (2) is finished, perform rotary evaporation and drying, and use 1 mol/L NaOH to deprotect to obtain final product. Separate and purify the final product through column to obtain a pure product—HPTS-lipo.

The two-dimensional pH fluorescent sensing film is prepared by using the foregoing fluorescent dye HPTS-lipo by the following steps.

(1) Dissolve 1 g hydrogel D4 in 10 mL 90% anhydrous ethanol:aqueous solution (V/V=90/10) to prepare hydrogel D4 stock solution.

(2) Prepare 1 mg/mL di-n-butylamine-HPTS stock solution.

(3) Take equal volume of the hydrogel D4 stock solution and the di-n-butylamine-HPTS stock solution and vortex until the solutions are fully mixed, wherein the mass ratio of the hydrogel D4 to the fluorescent dye in the mixed solution is 100:1. Take proper amount of the mixed solution, use 100 μm thick four-sided preparation device and the film coating machine to evenly coat the film on the surface of substrate—PET, and obtain a fluorescent sensing film with the thickness of about 10 μm after organic solvent is fully volatilized.

The method for preparing the two-dimensional pH fluorescent sensing film provided by the present invention is described in detail above. The principle and implement of the present invention are described herein with specific examples. The description of the foregoing examples is only used to help understand the method of the present invention and its central idea. It should be noted that for a person of ordinary skill in the art, several improvements and modifications can be made to the present invention without departing from the principles of the method. These improvements and modifications should also fall into the protection scope of the claims of the present invention.

What is claimed is:

1. A pH planar optode fluorescent sensing film, wherein the fluorescent sensing film is prepared by mixing a fluorescent dye HPTS-lipo with polymer material Hydrogel D4 and coating the mixture on a transparent substrate, wherein the HPTS-lipo is prepared by introducing di-n-butylamine or dimethylamine to sulfonic acid groups of HPTS, after the di-n-butylamine or dimethylamine groups are introduced, HPTS changes from water-soluble to fat-soluble.

2. The pH planar optode fluorescent sensing film according to claim 1, wherein a method for preparing the fluorescent dye HPTS-lipo comprises the following steps:

(1) reacting HPTS with acetic anhydride in NaOH solution to obtain a hydroxyl protected product, extracting the hydroxyl protected product with anhydrous ethanol, and performing suction filtration;

(2) refluxing the hydroxyl protected product and thionyl chloride to obtain a sulfonyl chloride intermediate; and (3) using DCM as a solvent, and reacting the di-n-butylamine or dimethylamine with the sulfonyl chloride intermediate; and after the reaction is completed, performing rotary evaporation, and using NaOH for deprotection to obtain HPTS-lipo.

3. A method for preparing the pH planar optode fluorescent sensing film according to claim 1, comprising the following steps:

(a) dissolving hydrogel D4 in an aqueous solution containing anhydrous ethanol to prepare hydrogel D4 stock solution;

(b) preparing fluorescent dye HPTS-lipo stock solution; and (c) mixing the hydrogel D4 stock solution with the fluorescent dye HPTS-lipo stock solution to obtain a mixed solution to prepare the film.

4. The method for preparing the pH planar optode fluorescent sensing film according to claim 3, wherein a mass ratio of the hydrogel D4 to the fluorescent dye in the mixed solution is 100:1.

5. The method for preparing the pH planar optode fluorescent sensing film according to claim 4, wherein a volume ratio of the anhydrous ethanol to water in the aqueous solution containing the anhydrous ethanol is 9:1.

6. The method for preparing the pH planar optode fluorescent sensing film according to claim 3, wherein a volume ratio of the anhydrous ethanol to water in the aqueous solution containing the anhydrous ethanol is 9:1.

7. A planar optode for monitoring two-dimensional pH value, wherein the planar optode is prepared by using the pH planar optode fluorescent sensing film according to claim 1.

8. An application method of the planar optode for monitoring two-dimensional pH value according to claim 7, wherein the fluorescent sensing film is fixed on an interface and excited by UV light source, a dynamic spatio-temporal distribution information of pH is acquired by an image capturing system.

9. The application method of the planar optode for monitoring two-dimensional pH value according to claim 8, wherein a wavelength of the ultraviolet excitation light source is 405 nm.

10. The application method of the planar optode for monitoring two-dimensional pH value according to claim 9, wherein the image capturing system comprises a CCD device and a terminal storage device.

11. The application method of the planar optode for monitoring two-dimensional pH value according to claim 8, wherein the image capturing system comprises a CCD device and a terminal storage device.

* * * * *